Nov. 4, 1958
E. O. KOLLMORGEN ET AL  
MECHANISM FOR ELIMINATING PARALLAX FROM  
TELESCOPIC SIGHTS AND THE LIKE  
Filed Aug. 25, 1955
2,858,732
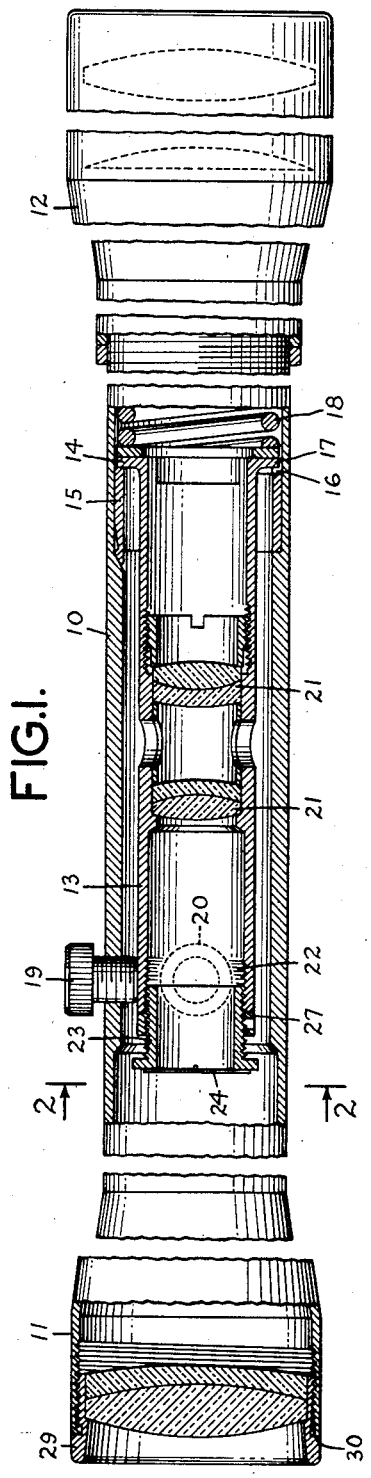
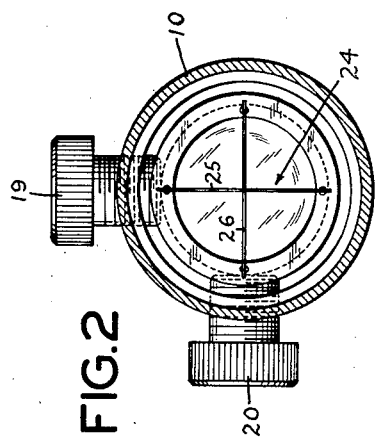
INVENTORS  
ERNST O. KOLLMORGEN  
HENRY G. THEUER  
BY  
THEIR ATTORNEYS

United States Patent Office 2,858,732
Patented Nov. 4, 1958

2,858,732

MECHANISM FOR ELIMINATING PARALLAX FROM TELESCOPIC SIGHTS AND THE LIKE

Ernst O. Kollmorgen, Amherst, and Henry G. Theuer, Northampton, Mass., assignors to Kollmorgen Optical Corporation, Northampton, Mass., a corporation of New York Application August 25, 1955, Serial No. 530,526

3 Claims. (Cl. 88—32)

This invention relates to improvements in telescopic rifle sights and the like and it relates more particularly to an improved mechanism for adjusting the reticle of a telescopic sight to locate it in the conjugate focal plane, formed by the objective lens, of an object at a given range, thereby to eliminate parallax of the sighting mark when the scope is aimed at the mark.

A parallax-setting device or mechanism must be capable of movement through a small distance axially of the telescopic sight and it must be provided with means enabling the reticle to be locked securely against unwanted movement caused by repeated recoil of the rifle to which the telescopic sight is attached. Moreover, the adjusting mechanism must be of such nature that a skilled instrument maker or gunsmith can readily make the necessary adjustment, to eliminate parallax. The adjusting mechanism must enable either a continuous movement of the reticle through the short distance or movement in very small increments to give the desired accuracy.

Most telescopic sights for rifles which include such a reticle adjustment have the reticle cell mounted on a "turret" which carries the knobs for adjusting the reticle for range and to correct for windage. The turret is secured to the barrel or tube of the sight by means of screws which are received in slots extending lengthwise of the barrel thereby enabling the turret and the reticle cell to be moved lengthwise of the barrel. This adjustment is relatively crude and inaccurate and, moreover, the screws tend to loosen so that the reticle can be jarred out of adjustment on continued use of the sight.

Another means for adjusting the reticle to eliminate parallax, includes mounting the objective of the telescopic sight in a threaded cell so that the objective can be adjusted axially of the barrel or tube of the sight. This arrangement is bulky and makes difficult the sealing of the telescopic sight to prevent the entry of moisture and dirt.

The present invention provides a mechanism for adjusting the reticle or reticle cell of a telescopic sight or the like to eliminate parallax which overcomes the disadvantages of the prior adjusting mechanisms by enabling a very accurate and easy adjustment of the reticle to eliminate parallax. More particularly, the present invention includes a reticle mount in the form of a frame or tube into which the reticle cell is threaded with a very fine thread enabling axial adjustment by screwing the cell into or out of the mount. The tube itself may be provided with mechanisms for adjusting it in one direction or two right-angularly related directions to compensate for range and/or windage.

By providing a thread of quite low pitch, adjustments as small as .005 inch or even smaller can be made by orienting a cross hair type of reticle to the nearest quarter turn. Adjustment of the reticle may be facilitated by mounting the objective of the rifle scope on a thread of similar pitch to that used for adjusting the reticle cell so that trial settings can be made enabling accurate adjustment of the reticle before final assembly or reassembly of the telescopic sight.

Inasmuch as the adjustment provided by the new mechanism is made by a screw threaded cell and tube, suitable locking means may be provided whereby the reticle cell cannot be jarred out of adjustment even by heavy and repeated recoil of the rifle to which the telescopic sight is attached. Moreover, a far more accurate adjustment is possible with the new reticle adjustment than with the mechanisms provided heretofore for making such adjustments.

For a better understanding of the present invention, reference may be had to the accompanying drawing in which:

Fig. 1 is a view partly in longitudinal section and partly broken away of a typical telescopic sight for a rifle with the lenses shown therein in dotted lines; and Fig. 2 is a view in cross section taken on line 2—2 of Fig. 1.

The present invention will be described with reference to an adjusting mechanism to eliminate parallax in a telescopic rifle sight of the type disclosed in the Kollmorgen and Rawlings U. S. application Serial No. 481,090, filed January 11, 1955, and now abandoned. The telescopic sight disclosed in application Serial No. 481,090, includes a barrel 10 having the objective 11 mounted at one end and the ocular 12 mounted at the opposite end. Mounted within the barrel 10 with capacity for pivotal movement is a tube 13 having a flange 14 at one end which rests against the edge of a supporting collar 15 serving as the pivot point or line for the tube. The opposite edge of the collar 15 is provided with a notch 16 receiving a flange 17 which guides and restrains the tube against rotation but allows it to tilt under the action of the compression spring 18 mounted in the right-hand end of the barrel. The spring 18 forces the left-hand end of the tube against the screws 19 and 20 threaded through the barrel and enables, respectively, adjustment of the tube 13 to compensate for changes in range or elevation and the velocity of wind. The tube 13 also carries erecting lenses 21 along the optical axis of the optical system.

The above-described telescopic sight is modified in accordance with the present invention to include the new adjustment for eliminating parallax. As best shown in Fig. 1, the left-hand end of the tube 13 is provided with a fine internal thread 22 into which is threaded a tubular collar or sleeve 23 on which the reticle 24 made up of crossed wires or hairs 25 and 26 are mounted. The sleeve 23 and the reticle 24 which form a reticle cell are adjusted axially of the barrel 10 and the tube 13 relative to the objective 11 by rotating the sleeve and thus screwing it into or out of the end of the tube 13. When the proper adjustment has been made, as will be explained more fully hereinafter, the cell 23 is locked into position by means of a lock nut 27 which is screwed up tightly against the end of the tube 13.

To facilitate making the adjustment of the reticle to eliminate parallax, the objective 11 includes a threaded ring 29 having threads of a pitch corresponding to the pitch of the threads on the sleeve 23 and the tube 13 by means of which the objective can be moved lengthwise of the barrel 10 toward and away from a stop 30 forming the end of the barrel 10. When the objective is screwed tight against the stop 30, it is in proper position in the optical system and in sealed relation to the barrel 10. The screw threads enabling adjustment of the objective 11 are used to advantage in adjusting the reticle cell 23. For example, the ring 29 of the objective 11 may be screwed up tight against the stop with the reticle cell 23 in only approximately a position to eliminate parallax. The ring 29 is then unscrewed until the objective lens assumes a relation to the reticle such as to eliminate parallax. By counting the number of revolutions or turns required to bring the ring 29 back against the stop 30, it is possible to determine the number of turns required to move the reticle cell to the same adjusted axial spacing from the objective 11 when the latter is screwed tight against the stop 30.

A very accurate adjustment, that is, within .005 inch can be achieved by providing the threads for the reticle cell and the threads of the objective ring with a pitch of 48 turns per inch. In this way, every quarter turn of the reticle cell to position one cross hair horizontally and the other vertically amounts to an axial adjustment of .005 inch.

While the mechanism for eliminating parallax described herein is particularly adaptable to telescopic sights of the type disclosed herein, it will be understood that a similar threaded mount for the reticle cell may be provided in other types of mechanisms for adjusting a telescopic sight for range and windage. Therefore, it should be understood that the form of telescopic sight disclosed herein is used to illustrate the parallax eliminating mechanism and not as limiting the invention to the form of sight disclosed herein.

We claim:

1. A mechanism for adjusting a reticle for parallax in an optical instrument having a barrel and lenses, including an objective lens mounted therein, comprising threaded means interposed between said objective lens and said barrel for adjusting said objective lens lengthwise of said barrel toward and away from a fixed position in said barrel in which said objective lens is in acurate optical relation to other lenses in said instrument, a reticle support in said barrel, means mounting said support in said barrel, a reticle cell mounted on said reticle mount in spaced relation to said objective lens, threaded means for adjusting said reticle cell lengthwise of said tubular body, said threaded means for adjusting said reticle cell and said threaded means for adjusting said objective lens having predetermined related pitches to enable said objective lens to be moved away from said fixed position and relative to said cell to determine the correct spacing between said objective lens and said reticle cell to eliminate parallax, and to retain correct spacing between said cell and said objective lens when the latter is in said fixed position by rotating said reticle cell a number of turns related to the number of turns required to move said objective lens to said fixed position and means for locking said reticle cell relative to said reticle mount in said correct spacing relative to said objective lens when the latter is in said fixed position.

2. The mechanism set forth in claim 1, in which said reticle support is a tubular element extending lengthwise of said barrel and said reticle cell is in threaded engagement with and extends outwardly beyond one end of said tubular element for manual adjustment lengthwise thereof by rotation of said cell.

3. A mechanism for adjusting the parallax setting of a reticle in a telescopic sight having a barrel and lenses mounted in said barrel including an objective lens, comprising a tubular reticle support mounted in and extending lengthwise of said barrel, a reticle cell having a fine thread thereon in threaded engagement with similar threads on said reticle support for adjusting said cell lengthwise of said support and barrel, a mount supporting said objective lens, cooperating threads on said mount and said barrel for adjusting said mount lengthwise of said barrel toward and away from a fixed position in said barrel in which said objective lens is in accurate optical relation to the other lenses of said sight, the threads on said cell and said mount having the same pitch to enable said objective lens to be moved away from said fixed position and relative to said cell to determine the correct spacing between said objective and said reticle cell to eliminate parallax, said cell being adjustable to retain said correct spacing by rotating said cell a number of turns equal to the number of turns required to return said objective lens to said fixed position, said cell being rotated to move said cell in the same direction as said objective lens, and means for locking said reticle cell in said correct spacing relative to said objective lens.

References Cited in the file of this patent

UNITED STATES PATENTS

| | | |
|---|---|---|
| 1,948,588 | Martin | Feb. 27, 1934 |
| 2,138,067 | Mossberg | Nov. 29, 1938 |
| 2,370,257 | Peck | Feb. 27, 1945 |
| 2,437,775 | Williams | Mar 16, 1948 |
| 2,580,280 | Bullard | Dec. 25, 1951 |